UNITED STATES PATENT OFFICE.

MYRTIL KAHN AND ANTON OSSENBECK, OF ELBERFELD, GERMANY, ASSIGNORS TO FARBENFABRIKEN VORM. FRIEDR. BAYER & CO., OF ELBERFELD, GERMANY, A CORPORATION OF GERMANY.

BLACK TRISAZO DYE.

1,000,606.  Specification of Letters Patent.  Patented Aug. 15, 1911.

No Drawing.    Application filed May 12, 1911.  Serial No. 626,801.

*To all whom it may concern:*

Be it known that we, MYRTIL KAHN and ANTON OSSENBECK, doctors of philosophy, chemists, citizens of the German Empire, residing at Elberfeld, Germany, have invented new and useful Improvements in Black Trisazo Dye, of which the following is a specification.

Our invention relates to the manufacture and production of new trisazo dyestuffs having most probably the formula:

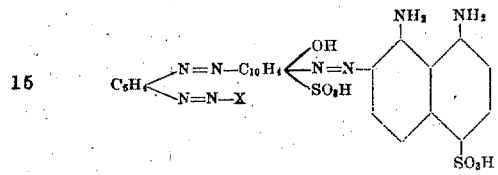

(X meaning a benzene derivative).

The process for their production consists in combining the tetrazo compound obtained from para-amino-benzene-azo-2-amino-8-naphthol-6-sulfonic acid or from para-amino-benzene-azo-2-amino-5-naphthol-7-sulfonic acid with one molecule of 1.8-naphthylenediamin-4-sulfonic acid and with one molecule of an amin or a phenol, such as meta-diamin, phenol, or aminophenol, or derivatives thereof.

The new coloring matters are after being dried and pulverized in the shape of their alkaline salts dark powders which are soluble in water generally with a blue-black coloration and which are soluble in concentrated sulfuric acid with a blue coloration; yielding upon treatment with stannous chlorid and hydrochloric acid para-phenylenediamin, a diaminonaphthol sulfonic acid, 1.7.8-triaminonaphthalene-4-sulfonic acid and an amin. They are suitable for dyeing cotton. The shades thus obtained can be developed with diazotized para-nitranilin, deep blue-black to black shades of good fastness being obtained.

In order to illustrate the new process more fully the following example is given, the parts being by weight: 15 parts of acetyl-para-phenylenediamin are diazotized and combined with an aqueous solution of 24 parts of 2-amino-8-naphthol-6-sulfonic acid containing an excess of sodium carbonate. The monoazo dye is saponified with NaOH acidulated and converted into the tetrazo compound. A freshly prepared paste of 24 parts of 1.8-naphthylenediamin-4-sulfonic acid is added and the acid is slowly neutralized. Subsequently a solution of 12.2 parts of toluylenediamin $$(CH_3 : NH_2 : NH_2 = 1:2:6)$$

is added. The mixture is rendered alkaline with sodium carbonate and is further stirred for 6 hours. The dye is filtered off and dried. It is after being dried and pulverized a dark powder having most probably the formula:

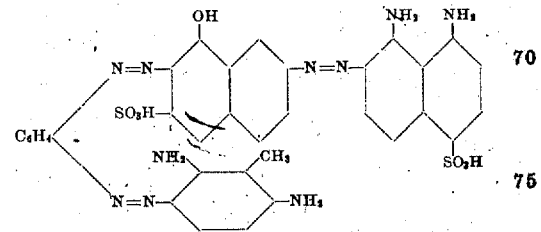

which is soluble in water with a blue-black coloration and which is soluble in concentrated sulfuric acid with a dark blue coloration. It yields upon reduction with stannous chlorid and hydrochloric acid para-phenylene-diamin, 2.7-diamino-8-naphthol-6-sulfonic acid, 1.7.8-triaminonaphthalene-4-sulfonic acid and triaminotoluene $$(CH_2 : NH_2 : NH_2 : NH_2 = 1:2:5:6).$$

It dyes cotton in blue-black shades which when developed with diazotized para-nitranilin change into a deep black fast to light and to washing which can be discharged to a pure white. The toluylenediamin mentioned in the example can be replaced by other diamins such as meta-phenylenediamin or their derivatives, by phenols such as resorcin, aminophenol and their derivatives or homologues. The 2-amino-8-naphthol-6-sulfonic acid can be replaced by the 2-amino-5-naphthol-7-sulfonic acid. The tetrazo compound can also be combined at first with a diamin, phenol, etc., and then with the 1.8-naphthylenediamin-4-sulfonic acid.

We claim:—

1. The herein described new trisazo dyestuffs of the formula:

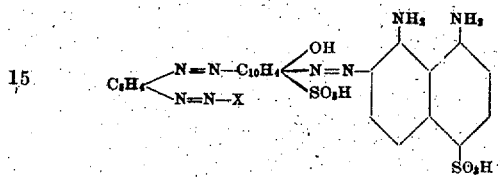

(X meaning a benzene derivative,) which dyestuffs are after being dried and pulverized in the shape of their alkaline salts dark powders which are soluble in water generally with a blue-black coloration and which are soluble in concentrated sulfuric acid with a blue coloration; yielding upon treatement with stannous chlorid and hydrochloric acid para-phenylenediamin, a diaminonaphthol sulfonic acid, 1.7.8-triaminonaphthalene-4-sulfonic acid and an amin, which dyes can be developed on the fiber with diazotized para-nitranilin giving deep blue-black to black shades of good fastness to washing and to light, substantially as described.

2. The herein described new trisazo dyestuff of the formula:

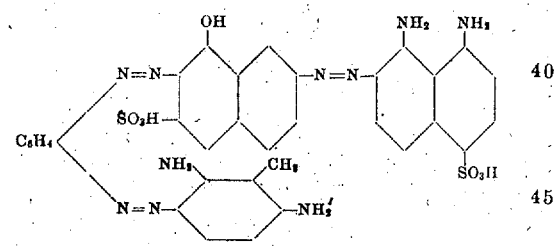

which is after being dried and pulverized a dark powder soluble in water with a blue-black coloration and soluble in concentrated sulfuric acid with a dark blue coloration; yielding upon reduction with stannous chlorid and hydrochloric acid para-phenylenediamin, 2.7-diamino-8-naphthol-6-sulfonic acid, 1.7.8-triaminonaphthalene-4-sulfonic acid and triaminotoluene, dyeing cotton blue-black shades which on being developed on fiber with diazotized para-nitranilin are changed into a deep black fast to light and to washing which can be discharged to a pure white, substantially as described.

In testimony whereof we have hereunto set our hands in the presence of two subscribing witnesses.

MYRTIL KAHN. [L. S.]
ANTON OSSENBECK. [L. S.]

Witnesses:
CHAS. J. WRIGHT,
ALFRED HENKEL.